April 3, 1956          A. CAPLAN          2,740,220
FISH LURE
Filed Aug. 10, 1953
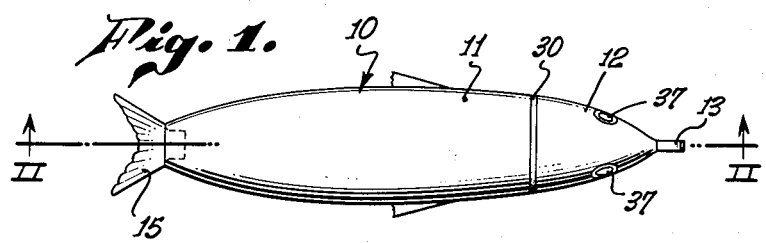
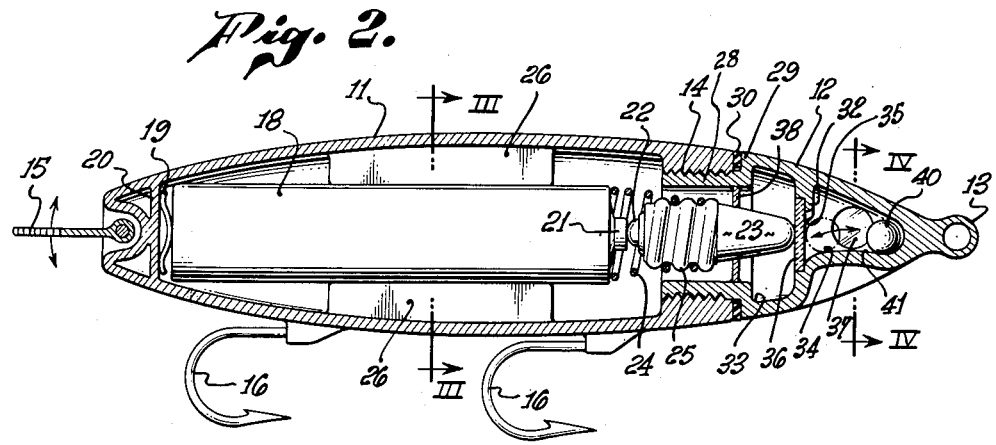
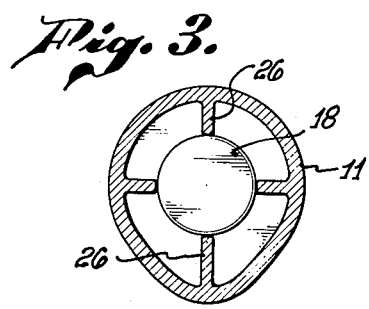
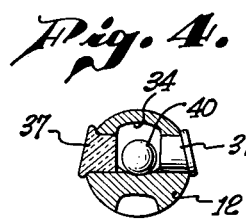
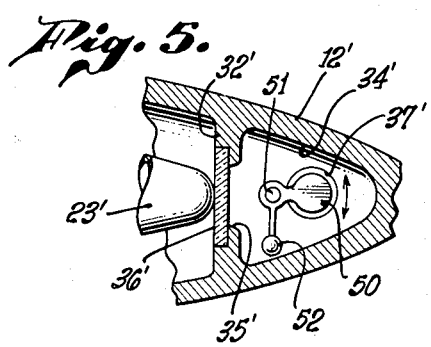
INVENTOR.
ALEXANDER CAPLAN,
BY
ATTORNEY.

United States Patent Office 2,740,220
Patented Apr. 3, 1956

2,740,220

FISH LURE

Alexander Caplan, Los Angeles, Calif.

Application August 10, 1953, Serial No. 373,092

8 Claims. (Cl. 43—17.6)

This invention relates to a fish lure and more particularly to a fish lure provided with eye-like means which create the illusion of winking as the lure moves through water for attracting fish.

It is generally believed that fish are attracted to fish lures which in some manner reflect rays of light which extend into the water. Various prior means have been utilized to cause reflection of such light rays including shiny metal objects of various shapes. Such prior metal objects were connected to the fish line in a manner so that the object would move in an irregular path as it was pulled through the water. Such prior fish lures obviously were not well adapted for attracting fish at great depth in the water because of the fact that light rays did not penetrate to such depths. Furthermore, such prior fish lures were not effective on days which were overcast or cloudy because of the lack of brilliant light rays from the sun.

This invention contemplates a fish lure which is adapted to carry its own light source, the light source being so arranged as to provide a path of light which emanates from a pair of eye-like windows provided in the fish lure. The invention contemplates means for interrupting the light path so as to create the illusion of winking eyes or intermittently reflected light.

The primary object of this invention is to disclose and provide a novel fish lure capable of creating the illusion of intermittently reflected light when pulled through the water.

An object of this invention is to design and provide a novel fish lure so constructed and arranged that a light path is provided from a light source means to a window in the body of the lure whereby light passes through said window.

Another object of this invention is to disclose and provide a novel fish lure wherein a head portion is provided with a chamber having windows therein which create the illusion of a winking eye as light passes therethrough.

A further object of this invention is to design and provide a novel fish lure having a hollow body portion adapted to carry a light source means and a head portion provided with eye-like windows and wherein means are carried in the head portion for intermittently interrupting the light from said light source means for creating the illusion of variably reflected light.

Generally speaking, this invention contemplates a fish lure constructed and arranged to carry a light source means within a hollow body portion. A head portion including a chamber is arranged to receive light from said light source means and to pass said light to a window in the chamber. Light interrupting means are carried in the chamber between the light source and the window and are responsive to motion of the lure as the lure is pulled through the water to intermittently interrupt the light passing through the window.

In the drawings:

Fig. 1 is a top view of a fish lure embodying this invention.

Fig. 2 is a sectional view of the lure shown in Fig. 1, the section being taken in a longitudinally extending plane indicated by line II—II of Fig. 1.

Fig. 3 is a transverse sectional view taken in the plane indicated by line III—III of Fig. 2.

Fig. 4 is a transverse sectional view taken in the plane indicated by line IV—IV of Fig. 2.

Fig. 5 is a fragmentary sectional view of a modified head portion embodying a different modification of a light interrupting means.

A fish lure embodying this invention is generally indicated at 10. The fish lure 10 comprises a two-piece body including an elongated, hollow, generally oval section streamlined body portion 11 and an interconnected hollow, generally cone-shaped head portion 12. The head portion may be provided with an eyelet 13 adapted to be connected to a leader on a fish line.

The hollow body portion 11 may be made of any suitable lightweight material, preferably a magnesium or aluminum alloy. The body portion 11 may be closed at the tail end and provided with an internally threaded opening 14 at the other end. The tail end of the body portion 11 may be provided with a transversely, pivotally mounted tail fin 15. The lower side of the body portion 11 may be provided with a plurality of longitudinally spaced fish hooks 16.

Light source means are carried within the hollow body portion 11 and may include a suitable battery 18 such as a small flashlight battery. The base of the battery 18 may seat against a leaf spring 19 which may be secured in any suitable manner to a transverse end wall partition 20 formed in the hollow body portion 11. The forward end of battery 18 may be provided with a contact button 21 in well-known manner, adapted to electrically contact an opposed contact element 22 of a light bulb 23. The light bulb is held in axial relation to the battery by means of a coil spring 24 which is adapted to be threaded on an externally threaded portion 25 provided on the light bulb. The spring 24 normally biases the light bulb out of electrical contact with the battery 18.

Means for positioning the battery in general coaxial relation with the hollow body portion may comprise a plurality of angularly spaced longitudinally and radially inwardly extending ribs 26 integrally formed on the interior of the hollow body portion 11.

The head portion 12 may be made of any suitable lightweight material and in this example may be formed of a suitable plastic material. The head portion 12 includes a rearwardly extending externally threaded section 28 adapted to threadedly engage the internal threads formed in the open end 14. The section 28 is of a diameter less than the base of the conical head portion 12 so as to provide a shoulder 29 against which may be seated an annular seal ring 30 which may be tightly compressed as the head portion is threaded into the hollow body portion for effecting a water-tight seal between the head and body portions. The conical shape of the head portion conforms with the curvature at the open end of the hollow body portion so as to present a smooth, virtually uninterrupted, outer surface on the fish lure at the connection of the head portion to the body portion.

A transverse partition wall 32 is provided intermediate the ends of the hollow body portion 12 and defines a rearwardly extending recess 33 adapted to receive a portion of the light bulb 23. Forwardly of partition 32 may be provided a front chamber 34. The partition wall 32 is provided with a port 35 of selected diameter and virtually axially aligned with the bulb 23. The port 35 may be covered by a transparent cover 36 against which the tip of bulb 23 may abut when the head portion is completely threaded into the body portion.

The cover 36 allows light from the bulb to pass through the port 35 into the chamber 34. A pair of eye-like windows 37 for said chamber 34 are provided in side wall portions of the head portion 12 and may comprise a pair of transparent plugs of any suitable plastic material.

The bulb 23 may be further positioned in axial alignment with the battery and with the port by means of a ported annular positioning disk 38 carried by the threaded section 28 slightly rearwardly of the recess 33.

In the example shown, means for intermittently interrupting the light path from the bulb 23 through the port 35 and through the windows 37 may comprise a freely movable, unrestrained spherical element 40. The diameter of the spherical element 40 may be slightly larger than the diameter of the port 35 so that when the element 40 is in its rearmost position at the port 35, the light path through port 35 is substantially interrupted and the ball prevents light passing through chamber 34 and through the windows 37. It should be noted that the bottom wall 41 of the chamber 34 may be convexly curved so that the element 40 will have a tendency to remain at its rearmost position adjacent the port 35 in light shut-off position.

When it is desired to use the fish lure described above on the end of a fish line for fishing, the head portion 12 should be tightly threaded into the body portion 11 so as to not only provide a water-tight seal but to also urge the light bulb rearwardly through contact with the cover 36 into electrical contact-making position with the battery 18. The leaf spring 19 serves to resiliently urge the battery toward the bulb. When the fish lure 10 is pulled through the water, the tail fin 15 causes the fish lure to irregularly move about its transverse axis so as to cause the spherical element 40 to roll back and forth in the chamber 34. Whenever the element 40 is adjacent the port 35, the light from the light source means is shut off and when it is in its most forward position, light is transmitted through the chamber and through the windows 37. The effect created by the irregular intermittent motion of the element 40 is such that the fish lure appears to be irregularly intermittently reflecting light and creates the illusion of a winking eye.

In the modification shown in Fig. 5 the head portion 12' likewise includes a hollow front chamber 34' and a transverse partition wall 32' provided with a port 35'. A transparent cover 36' is provided for the port 35'.

In this modification each window 37' may be substantially closed by a thin metal, generally circular disk 50 pivotally mounted on a transversely extending pin 51. The disk 50 may be connected with a suitable counterweight 52 arranged at right angles to the disk 50 and adapted to normally hold the disk 50 in window covering position. It will be readily apparent that as the fish lure body irregularly moves through the water, the counterweight 52 will swing backwardly and forwardly causing the disk 50 to move into and out of window covering position. Light from the light bulb 23' is thus irregularly and intermittently transmitted through the window 37'.

In these embodiments the eye-like windows have been exemplarily shown as being constructed out of transparent plugs inserted into openings in the head portion of the lure but the eye portions may be otherwise formed.

It will thus be readily apparent to those skilled in the art that a novel fish lure has been disclosed hereinabove which is so constructed and arranged that light rays may emanate therefrom in an intermittent, irregular manner so as to create the illusion of reflected light rays or to create the illusion of winking eyes. It is understood that various changes and modifications may be made in the arrangement of the light source means, the light interrupting means and the windows provided in the fish lure body and all such changes and modifications which come within the scope of the appended claims are embraced thereby.

I claim:

1. A fish lure comprising: a hollow body portion having an open, internally threaded end; light source means including a battery and a light bulb carried in the body portion; a hollow head portion having a rearwardly extending externally threaded section engaged with said internally threaded end; said head portion including an internal, intermediate, transverse partition defining a rearwardly facing recess adapted to receive the bulb and a forward chamber; said partition being provided with a port in alignment with said bulb; said head portion including a pair of eye-like windows for said chamber; and a freely movable ball carried in the chamber and having a diameter slightly larger than said port whereby movement of the ball against said port in response to motion of the lure in the water creates the illusion of winking eyes.

2. A fish lure as claimed in claim 1 wherein a transparent cover extends across said port and contacts the end of said bulb for urging said bulb into electrical contact with said battery when the head portion is interconnected with the body portion.

3. A fish lure comprising: a hollow body portion having an open, internally threaded end; light source means including a battery and a light bulb carried in the body portion; a hollow head portion having a rearwardly extending externally threaded section engaged with said internally threaded end; said head portion including an internal, intermediate, transverse partition defining a rearwardly facing recess adapted to receive the bulb and a forward chamber; said partition being provided with a port in alignment with said bulb; said head portion including a pair of eye-like windows for said chamber; and an unrestrained, freely movable element, having a size to virtually eclipse said port, and carried in the chamber responsive to movement of the lure and haphazardly interrupting the path of light between said port and said eye-like windows to create the illustion of winking eyes.

4. A fish lure comprising: an interconnected hollow body portion and a hollow head portion; light source means carried in the hollow body portion; said head portion including a transverse partition defining a rearwardly facing recess adapted to enclose an illuminatable part of said light source means and a front chamber, said head portion being provided with a pair of eye-like windows for said chamber at opposite sides thereof, said partition including a port opposite said light source means; and ball means in said front chamber for intermittently interrupting the light path from said port to said pair of eye-like windows to create the illusion of winking eyes.

5. A fish lure comprising: an interconnected hollow body portion and a hollow head portion; light source means carried in the hollow body portion; said head portion including a transverse partition defining a front chamber, said head portion being provided with a pair of eye-like windows for said chamber, said partition including a port opposite said light source means; and means in said front chamber for intermittently haphazardly interrupting the light path from said port to said eye-like windows to create the illusion of winking eyes, said interrupting means including a solid object dimensioned to virtually entirely obstruct the path of light between the port and said windows in one position.

6. In a fish lure the combination of: an interconnected hollow body portion and head portion; light source means carried within the hollow body portion; said head portion including a chamber arranged to receive light from said light source means; a window for the chamber; and an unrestrained, freely movable element in the chamber between the light source means and the window, said element being of a size to virtually obstruct the path of light between said light source and said window and responsive to motion of the lure for intermittently interrupting light passing through said window.

7. A fish lure comprising: an interconnected hollow body portion and a hollow head portion; light source means carried in the hollow body portion; said head portion including a chamber arranged to receive light from said light source means, said head portion being provided with an eye-like window for said chamber, and ball means in said chamber responsive to motion of the lure for intermittently interrupting the light path between said light source means and said window to create the illusion of a winking eye.

8. In a fish lure the combination of: a hollow lure body; light source means carried within the hollow body; a window in the body arranged to pass light from said light source means; and means for interrupting light passing through said window emanating from the light source means, said interrupting means including a movable element between said light source means and said window responsive to the motion of the lure in any direction whereby in one position of the element the light passing through the window is interrupted, said movable element being of a size to virtually obstruct the path of light between the window and the light source means.

References Cited in the file of this patent

UNITED STATES PATENTS

| | | |
|---|---|---|
| 1,241,368 | Green | Sept. 25, 1917 |
| 1,774,413 | Bendixen | Aug. 26, 1930 |
| 1,982,609 | Freese | Nov. 27, 1934 |
| 2,107,570 | Hobbs | Feb. 8, 1938 |
| 2,307,379 | Armstrong | Jan. 5, 1943 |
| 2,371,775 | Pope | Mar. 20, 1945 |
| 2,528,083 | Ruff | Oct. 31, 1950 |
| 2,598,471 | Waite | May 27, 1952 |